Jan. 8, 1952  H. L. BLUM  2,581,748
FLOW CONTROL DEVICE
Filed Jan. 4, 1946
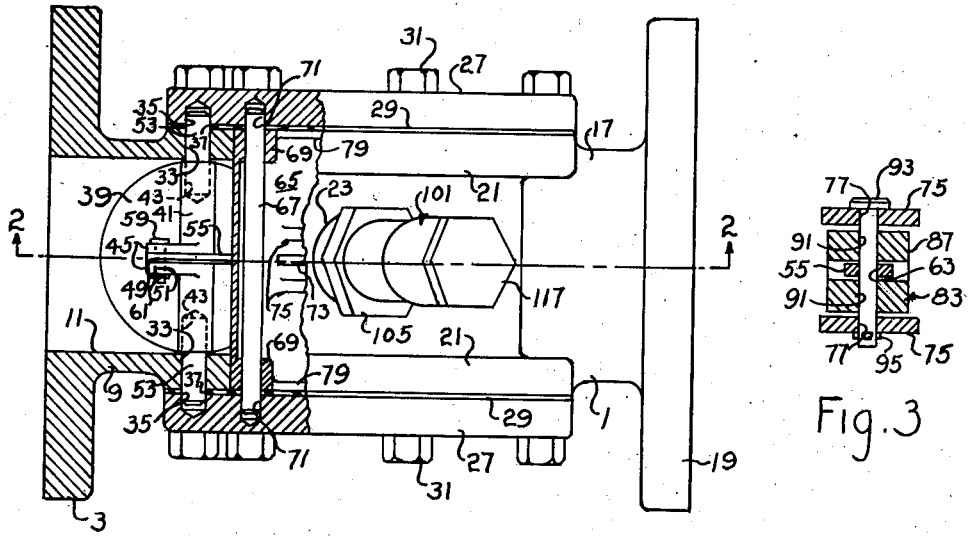
Fig. 1
Fig. 3
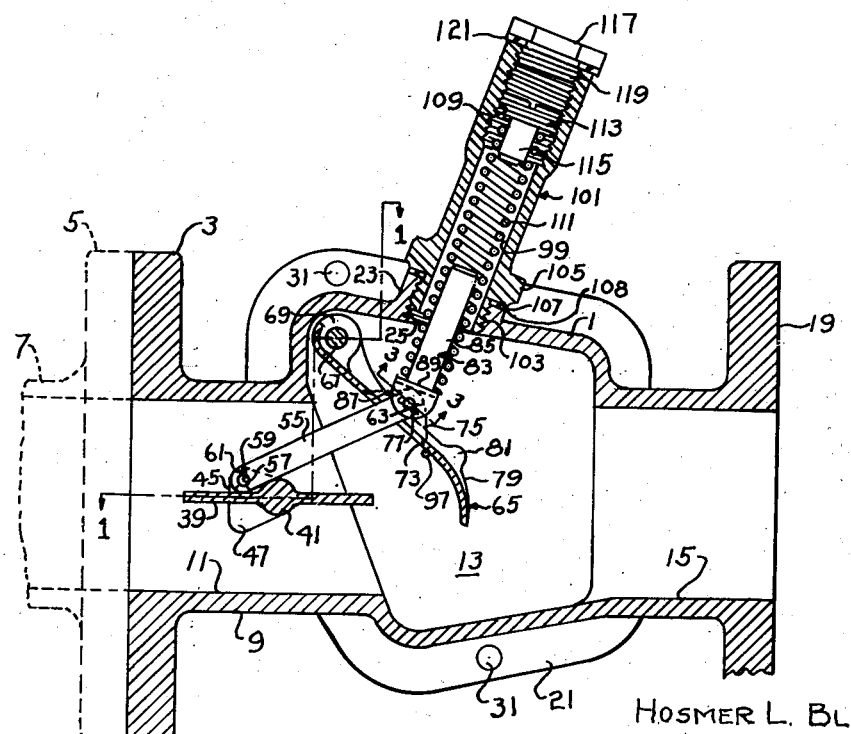
Fig. 2
HOSMER L. BLUM
INVENTOR.
BY Edmund W. E. Kamm
ATTORNEY Patented Jan. 8, 1952

2,581,748

UNITED STATES PATENT OFFICE 2,581,748

FLOW CONTROL DEVICE

Hosmer L. Blum, Fort Wayne, Ind., assignor to Bowser, Inc., Fort Wayne, Ind., a corporation of Indiana Application January 4, 1946, Serial No. 639,010

6 Claims. (Cl. 137—152)

This invention relates to a fluid flow control valve, more specifically, it relates to a rate of flow responsive valve for limiting the flow of fluid through an hydraulic device or instrument such as a meter.

In a fluid flow device such as a meter, it is desirable that a regulatory mechanism be placed in the line to control the rate of flow of fluid through the device so that it will not overspeed and be damaged.

It is an object of this invention to provide device to control or limit the flow of fluid through the meter.

It is another object of this invention to provided a fluid flow regulator which is operable on either the inlet or the outlet side of a fluid flow device.

It is another object of this invention to provide a fluid flow control device which is adjustable.

It is yet another object of this invention to provide a fluid flow control device which will provide a substantially constant flow of fluid when the supply is adequate.

It is still another object of this invention to provide a fluid flow control device which is responsive to the velocity of fluid flow through the device.

These and other objects will become apparent from a study of this specification and the drawings which are attached hereto and made a part hereof and in which:

Figure 1 is a plan view of the valve with parts of the body and side plates in section to show the butterfly valve, the vane and the linkage. The section is taken substantially on the line 1—1 of Figure 2.

Figure 2 is a section taken on the line 2—2 of Figure 1, showing the butterfly valve and the vane in full open position.

Figure 3 is a section taken on the line 3—3 of Figure 2, showing the connection of the spring guide and the link with the vane.

Referring to Figures 1 and 2 of the drawings, the numeral 1 designates the valve body which has an inlet flange 3 which may be connected with an outlet flange 5 on a fluid flow device 7, such as, for example, a rotary or other meter.

A cylindrical conduit 9 of the body has a bore 11 which connects the flange 3 with a chamber 13 which in turn connects with a cylindrical outlet conduit 15 which terminates in an outlet flange 19. Flanges 21 are formed on each side of the body and conform generally to the shape of chamber 13 as viewed in Figure 2.

A boss 23 extends from the top of the body, is inclined to the right as shown in Figure 2, and is provided with an axial, tapped hole 25.

Side plates 27, adapted to seal the sides of the chamber 13, mate with the flanges 21 and are held seated on gaskets 29 by cap screws 31.

Bearings 33 are formed in the body and flanges 21 and clearance holes 35 are drilled part way through the sealing faces of the side plates 27 in line with the bearings 33, which are substantially on the horizontal centerline of the bore 11. Corresponding holes 37 are formed in gasket 29.

A butterfly valve 39 is fitted snugly, but rotatably, in the bore 11 and comprises a diametrical hub 41 which is provided at each end with a bore 43 which is in alignment with the holes 33 and 35 described above.

Also formed on the hub near the center of the valve and disposed on opposite sides thereof are a pair of ears 45 and a lug 47 respectively. Both the pair of ears and the lug lie to the left of the axis of the hub when the valve is in the horizontal position (Figure 2). The ears 45 are perforated at 51 to receive a pin 59. The lug 47 tends to return the valve toward the Figure 2 position.

Journal pins 53 are pressed into the holes 43 in the boss 41 and extend through the bearings 33 in the side flanges and project into the holes 35 in the side plates. This construction permits ready removal of the pins after the side plates have been removed and thus facilitates repairs, etc.

A link 55 enters the slot 49 which separates ears 45 and has a hole 57 near one end. A headed pin 59 enters the holes 51 through the hole 57 to hold the link and valve together. A shaft clip 61 engages a notch on the pin end opposite the head. Another hole 63 is located at the opposite end of the link.

A vane 65 is hinged on a shaft 67 which is mounted in the upper left hand corner of the chamber 13. The shaft extends through bosses 69 on the vane and is journalled in blind bearings 71 formed in the side plates. The vane is provided with a vertical slot 73 and a pair of ears 75 project from the right hand side of the vane (Figure 2), one on each side of the slot. These ears are provided with aligned holes 77. Two ribs 79 extend the length of the vane on either side and are provided with projections 81 which serve as a stop for the vane in its up position, the projections striking the top wall of the body 1.

A spring guide 83, comprising a stem 85 and a yoke portion 87 fixed to the bottom of the stem forming a shoulder 89 at their junction, is connected to the vane. Holes 91 extend through the legs of the yoke. The vane, the link 55 and the spring guide are assembled as shown in Figures 2 and 3 and are held in place by the headed pin 93, which enters the holes 91 in the yoke, holes 77 in the ears and the hole 63 of the link. A spring clip 95 holds the pin in place.

Pins 97 project into the chamber 13 from the side plates 27 and provide a stop for the vane in its lower position, shown in Figure 2. This determines the full open position of the valve.

The stem 85 of spring guide 83 extends through the hole 25 in the body and into the bore 99 of a tubular bonnet 101 which is externally threaded at its lower end 103 to engage the threads 25. Directly above the threads, hexagon 105 is provided for wrench engagement. A shoulder 107 formed by the juncture of the threaded portion 103 and the hexagon 105, provides a seat for the gasket 108 which seals against the top of boss 23. The bonnet is counter-bored and internally threaded at 109.

A spring 111 is held in compression against the shoulder 89 on the yoke of the spring guide 83 by a screw 113 which has a guide portion 115 formed on the lower end. The screw engages threads 109. A cap 117 having a threaded portion 119, engages the threads 109 above the screw 113, and, with gasket 121, seals the end of the bonnet.

Operation

Applicant's flow control valve may be placed on either the inlet or outlet side of a meter or other instrument, however, the outlet side is preferred, because such mounting prevents wire drawing and other undesirable effects.

The normal position of the butterfly and vane is with the vane in contact with pins 97 as shown in Figures 1 and 2. This position is maintained by pressure exerted by the spring 111 upon the vane until the flow of liquid increases sufficiently to overcome the pressure of the spring and to swing the lower end of the vane 65 upward in an arc about shaft 67.

The upward motion of the vane is transmitted through link 55 to partially close the butterfly 39, thus limiting the flow through the bore 11 and, of course, the flow through any fluid flow device located upstream or downstream of the valve will be varied accordingly. However, should the velocity of the liquid increase further, the vane will move farther in a counter-clockwise direction to close the valve more. The limit is reached when the stops 81 contact the body 1. Should the velocity decrease, the spring will rotate the vane clockwise and open the valve accordingly, and thus the valve will vary the volume of flow through the conduit inversely as the velocity of the flowing fluid varies.

The minimum velocity to which the valve will respond may be selected by adjusting the compression applied by spring 111. For instance, the valve shown is of 3" pipe size. It will have a capacity range of 225 to 300 g. p. m., depending upon the pressure exerted by the spring 111. When it is desired to limit the flow to the lower figure, the adjusting screw 113 is backed up in threads 109 to lessen the pressure of spring 111 on the vane 65, whereby the vane will start to close the butterfly at a relatively low fluid velocity. Conversely, when it is desired to limit the flow to the upper figure, the adjusting screw is tightened down to increase the spring pressure upon the vane, requiring a greater fluid velocity to actuate the vane and the butterfly to restrict the bore 11.

Any decrease in the force on the vane will permit the vane to be pushed downward by the spring 111, which will move the butterfly valve toward its open position.

It is obvious that various changes may be made in the form, structure and arrangement of parts without departing from the spirit of the invention. Accordingly, applicant does not desire to be limited to the specific embodiment disclosed herein primarily for purposes of illustration; but instead he desires protection falling fairly within the scope of the appended claims.

What I claim to be new and desire to protect by Letters Patent of the United States is:

1. In a fluid flow control valve, a body having an inlet and an outlet, a source of fluid under pressure connected to said inlet, a butterfly valve in said inlet movable between open and closed positions, a swinging vane in said body, a link pivotally connected at one end to said butterfly valve and pivot means connecting the other end of said link to said vane, means mounting said vane in the path of the fluid flowing through said inlet, said vane being progressively moved out of said path, as the flow increases, the link connection being so arranged as to move said butterfly valve toward the closed position as the vane moves out of said flow path, a plunger having one end connected to said vane by said pivot means and a spring acting on said plunger to urge said vane into the path of said fluid.

2. In a fluid flow control valve, a valve body having an inlet and an outlet, a source of liquid under pressure connected to said inlet, a butterfly valve movable between open and closed positions in said inlet, a swinging vane in said body, means mounting said vane in the path of the fluid flowing through said inlet, said vane being progressively moved out of said path, as the flow increases, means comprising a link connected at either end to the valve and vane, the link connection being so arranged as to move said butterfly valve toward the closed position as the vane moves out of said flow path, a plunger connected to the vane and a spring acting upon said plunger for urging said vane into the flow of said fluid, and stops limiting the movement of said vane and said butterfly valve.

3. In a fluid valve, a body having a central chamber, side covers for said chamber, an inlet and an outlet communicating with said chamber, the walls of said chamber having a pair of diametrically opposed holes formed therein, each of said covers having a blind hole aligned with the holes in the walls, a butterfly valve mounted to control the inlet and having a hub, journal means formed in said hub, pin means mounted in said holes and journal means for rotatably supporting said valve, said pins being held in place by said covers.

4. In a liquid flow control valve, a body having a chamber, an inlet and an outlet for said chamber, each having a cross-sectional area substantially smaller than that of the chamber, means for supplying a flow of liquid to said chamber, a vane, means mounting said vane in the path of the fluid flowing through said inlet, said vane being progressively moved out of said path, as the flow increases, means for urging said vane into the path of the flow, means for limiting the motion of said vane, in response to said urging means, to a position in which the effective cross-sectional area of the chamber, at the vane, is at least substantially equal to that of the inlet, said vane being pivotally mounted at its upper end, a valve movably mounted to control the flow of liquid through said body, and means connecting said vane to actuate said valve, said connecting means being so arranged as to move said valve toward closed position as the vane moves out of the flow path.

5. In a fluid flow control valve, a valve body having an inlet and an outlet, a source of liquid under pressure connected to said inlet, a valve disposed in said inlet and having shaft means extending through the case at either side, an open-ended chamber in said body communicating with the inlet and outlet, a swinging vane having its upper end pivotally mounted on shaft means which project through said body, means for connecting said vane to said valve, caps for the ends of the chamber, detachably connected to the body and sealingly covering both said shaft means, said vane being mounted in the path of the fluid flowing through said inlet, said vane being progressively moved out of said path, as the flow increases, said connecting means being so arranged as to move said valve toward the closed position, as the vane moves out of said flow path, to restrict said inlet, and resilient means for urging said vane into the path of said fluid, comprising a plunger connected to said vane and a spring acting on said plunger.

6. In a fluid flow control valve, a valve body having an inlet and an outlet, a source of fluid under pressure connected to said inlet, a valve movable between open and closed positions in said inlet, a swinging vane having its upper end pivotally mounted in said body and means for connecting said vane to said valve, said vane being mounted in the path of the fluid flowing through said inlet, said vane being progressively moved out of said path, as the flow increases, said connecting means being so arranged as to move the valve toward the closed position as said vane moves out of said flow path, means for urging said vane into the path of said fluid comprising a plunger, a spring for actuating said plunger, means pivotally connecting said plunger to actuate said vane, and means for adjusting the pressure of said spring.

HOSMER L. BLUM.

REFERENCES CITED

The following references are of record in the file of this patent:

UNITED STATES PATENTS

| Number | Name | Date |
|---|---|---|
| 635,829 | Weston and Jackson | Oct. 31, 1899 |
| 791,447 | Breath | June 6, 1905 |
| 843,959 | McBride | Feb. 12, 1907 |
| 1,201,492 | Newton | Oct. 17, 1916 |
| 1,229,500 | Newton | June 12, 1917 |
| 1,550,233 | Anderson | Aug. 18, 1925 |
| 1,605,269 | Myer | Nov. 2, 1926 |

FOREIGN PATENTS

| Number | Country | Date |
|---|---|---|
| 484,303 | France | of 1917 |